United States Patent
Otani et al.

(10) Patent No.: US 8,265,231 B2
(45) Date of Patent: Sep. 11, 2012

(54) METHOD FOR IDENTIFYING A DEVICE TRANSMITTING AN ECHO SIGNAL, ECHO SOURCE IDENTIFYING METHOD FOR IDENTIFYING ECHO SOURCE, MEASURING APPARATUS FOR IDENTIFYING A SOURCE OF AN ECHO, AND ECHO SOURCE IDENTIFYING APPARATUS

(75) Inventors: Takeshi Otani, Kawasaki (JP); Yasuji Ota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 846 days.

(21) Appl. No.: 12/407,111

(22) Filed: Mar. 19, 2009

(65) Prior Publication Data
US 2009/0245475 A1    Oct. 1, 2009

(30) Foreign Application Priority Data
Mar. 25, 2008  (JP) .................................. 2008-078663

(51) Int. Cl.
  H04M 1/24   (2006.01)
  H04M 3/08   (2006.01)
  H04M 3/22   (2006.01)
(52) U.S. Cl. ............... 379/22.03; 379/14.01; 379/15.05; 379/27.02
(58) Field of Classification Search ............... 379/3, 12, 379/14.01, 15.05, 22, 22.01, 22.03, 27.01, 379/27.02, 27.03, 31, 406.05, 406.1, 406.11, 379/406.15
See application file for complete search history.

(56) References Cited

U.S. PATENT DOCUMENTS

| | | | |
|---|---|---|---|
| 4,947,425 A | 8/1990 | Grizmala et al. | |
| 5,943,645 A | 8/1999 | Ho et al. | |
| 6,552,998 B1 * | 4/2003 | Matsunaga | .................... 370/228 |
| 7,003,101 B2 | 2/2006 | Seibert | |
| 2006/0274791 A1 * | 12/2006 | Garcia et al. | .................. 370/508 |

FOREIGN PATENT DOCUMENTS

| | | |
|---|---|---|
| JP | 3310302 | 5/2002 |
| JP | 2003-134005 | 5/2003 |
| JP | 2004-297236 | 10/2004 |
| JP | 2008-061147 | 3/2008 |
| WO | 00/25487 | 5/2000 |
| WO | 01/01158 | 1/2001 |
| WO | 02/082727 | 10/2002 |

OTHER PUBLICATIONS

European Search Report dated Jul. 23, 2009, from the corresponding European Application.
Notification of Reason for Refusal, dated Mar. 30, 2010, from the corresponding Japanese Application No. 2008-078663.

* cited by examiner

*Primary Examiner* — Binh Tieu
(74) *Attorney, Agent, or Firm* — Katten Muchin Rosenman LLP (57) ABSTRACT

A method for identifying among a plurality of devices, through which a voice communication path is connected, a device transmitting an echo signal onto the voice communication path, includes transmitting a predetermined signal to each of the devices from a predetermined portion on the voice communication path, receiving a response signal for the predetermined signal from each of the devices, measuring a period of time for the predetermined signal to travel from the predetermined portion to each of the devices and for the response signal to travel back to the predetermined portion, monitoring a upstream signal and a downstream signal traveling on the voice communication path, extracting an echo component from the downstream signal to determine an echo delay time, and comparing the period of time and the echo delay time to determine a device which causes the echo signal.

20 Claims, 12 Drawing Sheets

Fig. 10 k: THE NUMBER OF THE BAND
$f_{LOW}(\ )$: LOWER LIMIT OF FREQUENCY IN EACH BAND
$f_{HIGH}(\ )$: UPPER LIMIT OF FREQUENCY IN EACH BAND

METHOD FOR IDENTIFYING A DEVICE TRANSMITTING AN ECHO SIGNAL, ECHO SOURCE IDENTIFYING METHOD FOR IDENTIFYING ECHO SOURCE, MEASURING APPARATUS FOR IDENTIFYING A SOURCE OF AN ECHO, AND ECHO SOURCE IDENTIFYING APPARATUS

CROSS-REFERENCE TO RELATED APPLICATIONS

This application is based upon and claims the benefit of priority of the prior Japanese Patent Application No. 2008-78663, filed on Mar. 25, 2008, the entire contents of which are incorporated herein by reference.

FIELD

The embodiments discussed herein are related to methods and apparatus for identifying a location of an echo source on a telephone network.

BACKGROUND

Figure 1:
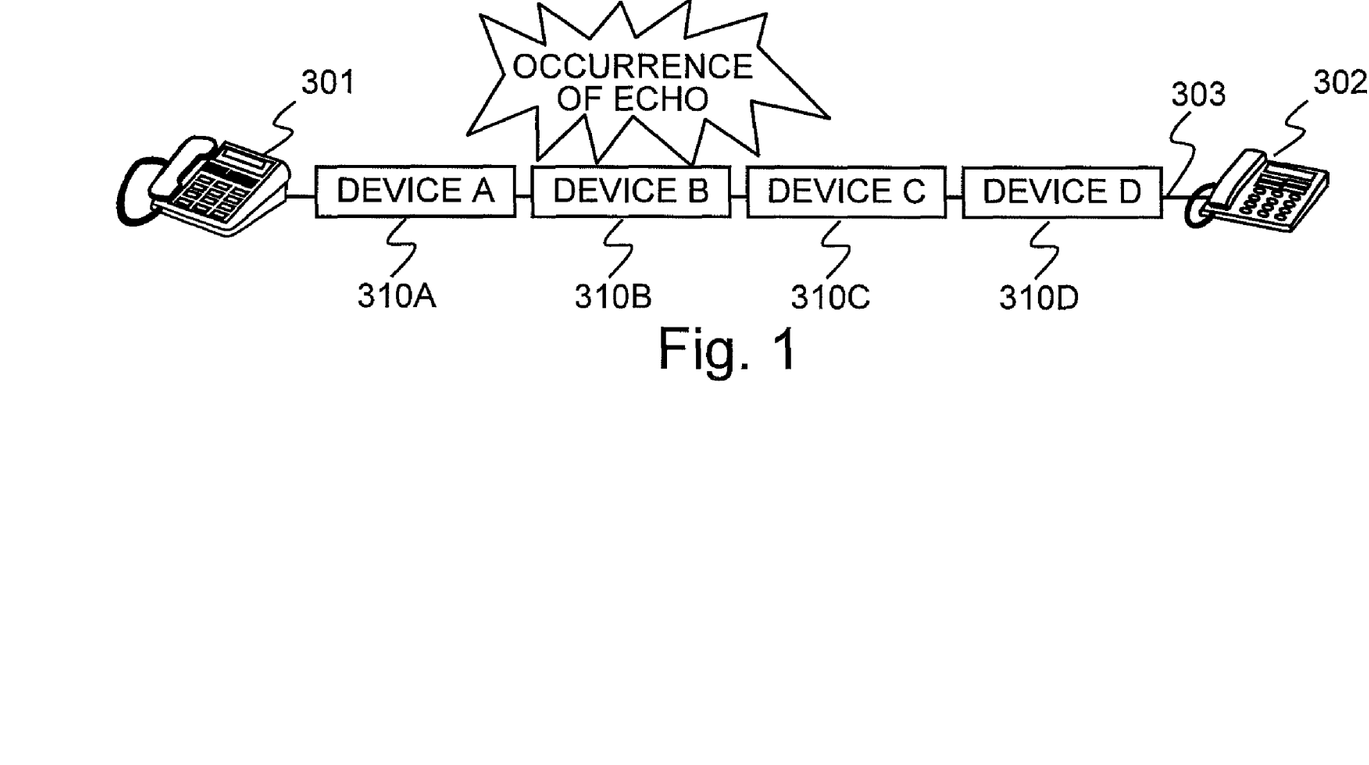
FIG. 1 is a diagram illustrating a telephone network including two telephone sets for voice communications and a communication path connecting between the two telephone sets.

FIG. 1 shows two telephone sets 301 and 302 for voice communications which are connected a communication path 303, such as a telephone network or a voice over Internet protocol (VoIP) network. On the communication path 303, four devices 310A, 310B, 310C, and 310D are provided with an example. These four devices 310A to 310D might cause an echo when they fall in failure or disorder.

Since an echo disturbs clear voice conversations on a cell phone network or an IP phone network, carriers usually take countermeasures, such as adjusting or replacing the device, against the echo generation. However, it is difficult to identify which device generates the echo.

Japanese Patent No. 3310302 discloses one of the echo detecting methods for identifying an echo source, in which an echo is detected at a previous stage to every device on a communication path and an echo source is determined on the detection result.

Figure 2A:
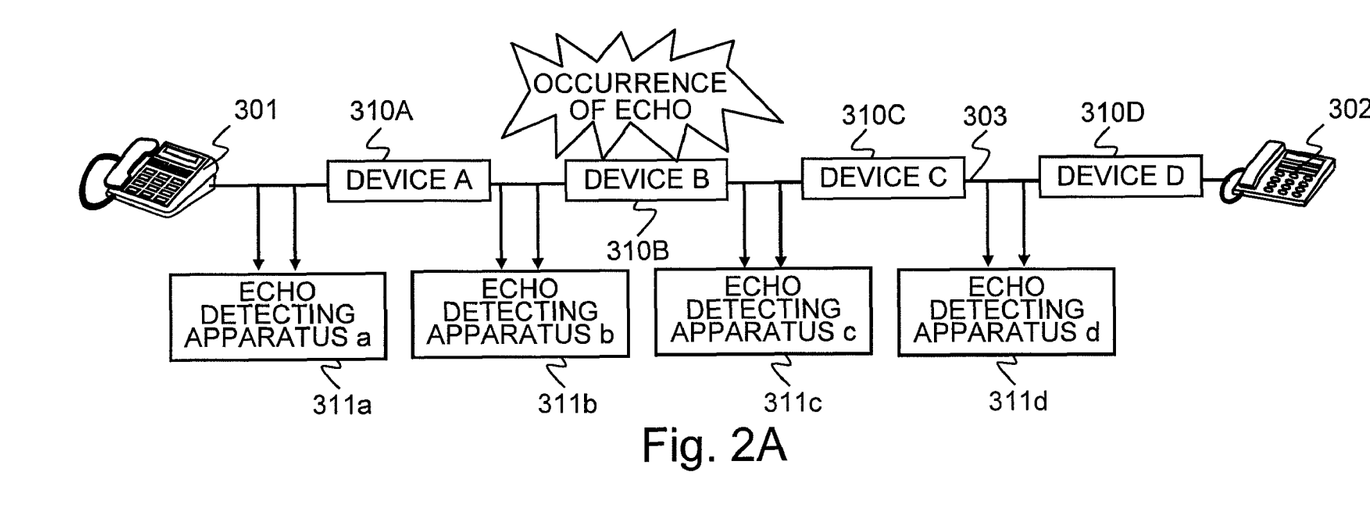
FIG. 2A is a diagram illustrating a conventional echo detecting method and FIG. 2B illustrates results of detection of a presence of an echo.

FIG. 2A is a conceptual view of the echo detecting method as disclosed in the publication.

Echo detecting apparatuses 311a, 311b, 311c, and 311d are provided at previous stages to all of the devices 310A, 310B, 310C, and 310D on a communication path 303 similarly to that of FIG. 1. The echo detecting apparatuses 311a, 311b, 311c, and 311d monitor an upstream and a downstream signals transmitted on the communication path 303 to determine whether an echo occurs ("echo present") or not ("echo absent"). When an echo is detected with the echo detecting apparatuses 311a and 311b and no echo is detected with the echo detection devices 311c and 311d, as shown in FIG. 2B, the device 310B is identified as a source of the echo.

However, according to the method disclosed in the publication above, echo detecting apparatuses 311a to 311d should be provided for every device on the communication path 303, leading to an increase in cost. In addition, the method has a problem that an echo source cannot be identified correctly if plural devices generate an echo at the same time.

Figure 2B:
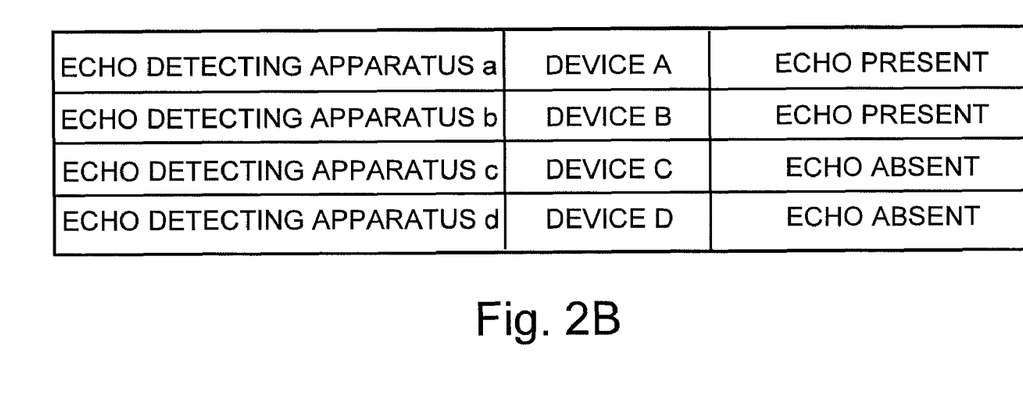
Figure 3A:
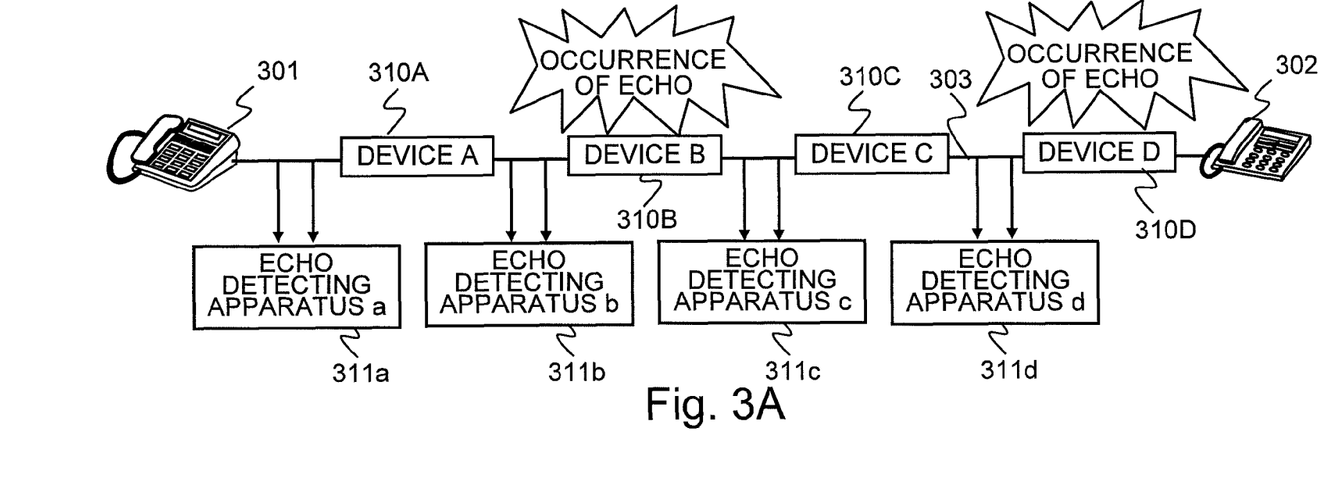
FIG. 3A is a diagram illustrating a problem in the method of FIGS. 2A and 2B.
Figure 3B:
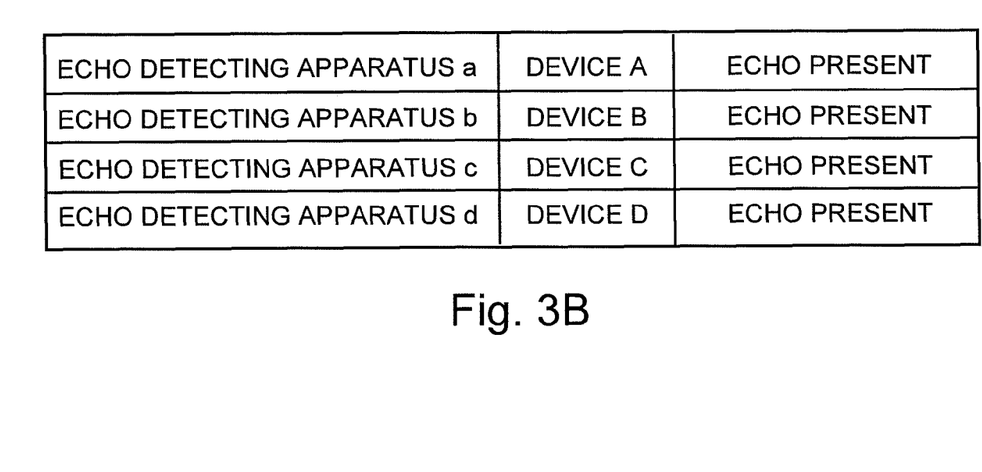
FIG. 3B illustrates results of detection of a presence of an echo.

FIGS. 3A and 3B illustrate a conceptual view and a table similar one shown in FIGS. 2A and 2B, which explain a problem in the method.

An assumption of echo occurrence in the devices 310B and 310D, such as illustrated in FIG. 3A, leads the results shown in FIG. 3B, in which a detection result of all of the four echo detecting apparatuses 311a, 311b, 311c, and 311d indicates "echo present". In such a case, the device 310D is determined as an echo source and an echo generated in the device 310B would not be detected.

Further, as disclosed in Japanese Laid-open Patent Publication No. 2003-134005, for example, a technique called "echo canceller" has been proposed. Since the echo canceller absorbs an echo disagreeable to the ear, it is one of promising techniques. However, this technique is not intended to identify an echo source.

SUMMARY

According to one aspect of the invention, a method for identifying among a plurality of devices, through which a voice communication path is connected, a device transmitting an echo signal onto the voice communication path, includes transmitting a predetermined signal to each of the devices from a predetermined portion on the voice communication path, receiving a response signal for the predetermined signal from each of the devices, measuring a period of time for the predetermined signal to travel from the predetermined portion to each of the devices and for the response signal to travel back to the predetermined portion, monitoring a upstream signal and a downstream signal traveling on the voice communication path, extracting an eco component from the downstream signal to determine an echo delay time, and comparing the period of time and the echo delay time to determine a device which causes the echo signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

Figures 4A, 4B:
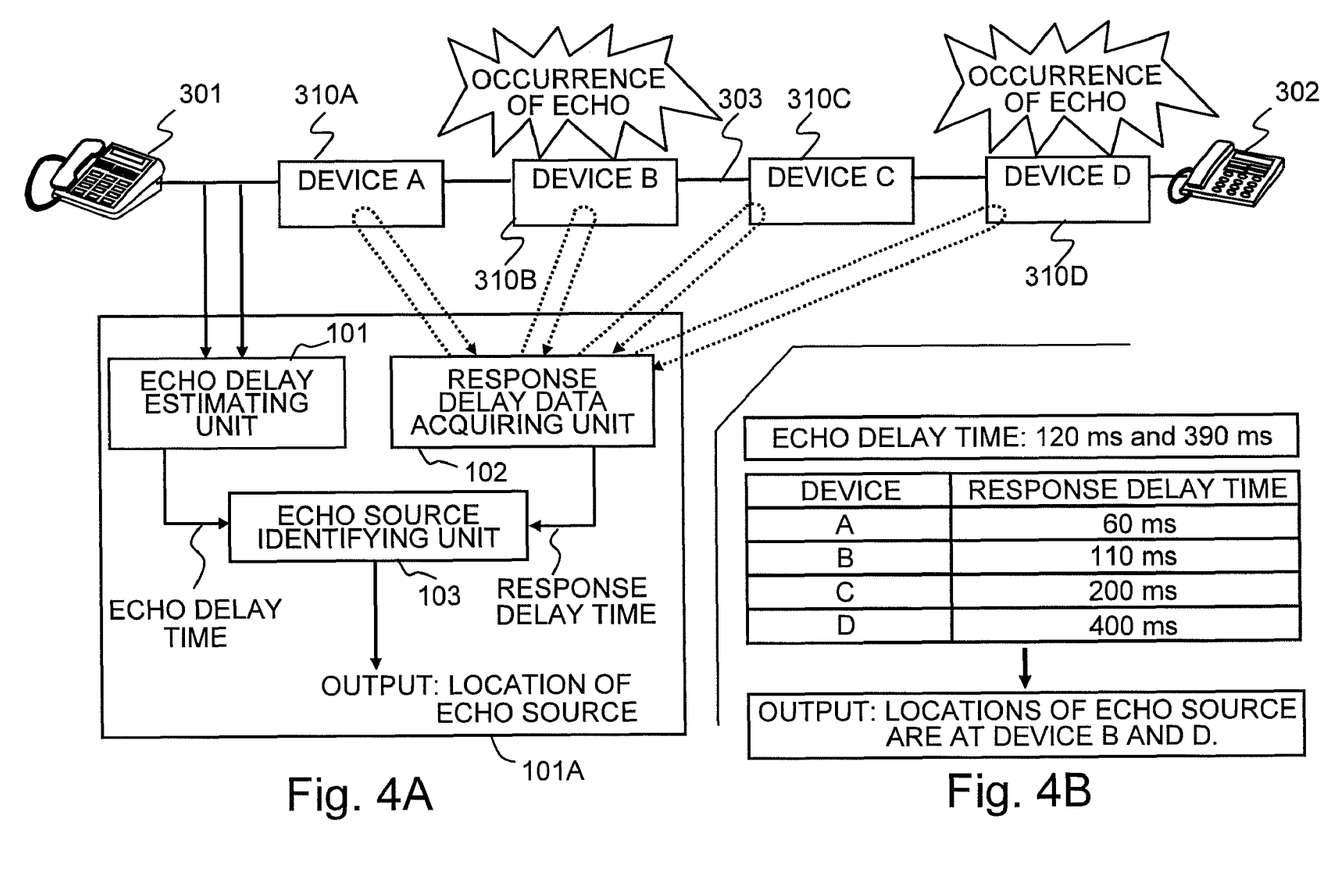
FIG. 4A is a block diagram illustrating the configuration of an echo source identifying apparatus according to a first embodiment and FIG. 4B illustrates a stored data of response delay time.

FIG. 4A illustrates a block diagram of the configuration of an echo source identifying apparatus 100A according to a first embodiment, and a communication path 303 similar to that illustrated in FIGS. 1 to 3A.

FIG. 4B illustrates a table which includes data of response delay time acquired through a response delay data acquiring unit 102.

Further, the echo source identifying apparatus 100A includes an echo delay estimating unit 101, and an echo source identifying unit 103.

The response delay data acquiring unit 102 determines a response delay time which is a round-trip time required for a signal to travel between positions on the path of the echo source identifying apparatus 100A and of each of the devices 310A, 310B, 310C, and 310D. The data of response delay times are stored as the resultant information. Since the data of response delay time will be varied with change the configurations of devices on the communication path 303, the information stored in the response delay data acquiring unit 102 is updated to information of a newly determined response delay time of a device that would be influenced by the change.

There are several methods for determining a response delay time, such as ones shown bellow, and a desired one may be used.

(a) The response delay time is acquired by calculating a transmission and a reception times; the transmission time is the time at which any known signal is output from an echo source identifying apparatus 100A to a communication path; and the reception time is a time at which a device as a measurement target receives the signal.

(b) A method is for the communication path on which packet communication is established. The response delay time is acquired from a transmission and a reception times; information of the transmission time is included in a packet transmitted to the path from the echo source identifying apparatus 100A; and the reception time is a time at which the packet is received by a device as a measurement target.

(c) A method is for the communication path on which packet communication is established. The response delay time is acquired from a transmission and a reception times; the transmission time is a time at which the echo source identifying apparatus 100A transmits a packet for requesting a response to a device as a measurement target; the reception time is a time at which the echo source identifying apparatus 100A receives a packet as the response from the device.

The response delay data acquiring unit 102 of the echo source identifying apparatus 100A obtains the response delay time corresponding to the time required to transfer a signal between the echo source identifying apparatus 100A and each of the devices 310A, 310B, 310C, and 310D, and then stores the information of the response delay time. The response delay time can be determined on the base of any of the above methods in (a) to (c).

The echo delay estimating unit 101 monitors the up and downstream signals to determine whether an echo is generated based on these signals. When an echo is detected, the echo delay estimating unit 101, further, estimates an echo delay time from the time of passage of the upstream signal and the time of passage of the downstream signal as an echo. Here is assumed that the echo delay estimating unit 101 estimates the echo delay time as 120 ms and 390 ms, while the echo delay time will be estimated by the use of the algorithm described in the following embodiments.

Each of the echo delay time, such as 120 ms and 390 ms, determined with the echo delay estimating unit 101 is compared with the response delay time of each of the devices 310A, 310B, 310C, and 310D by the echo source identifying unit 103. Then the echo source identifying unit 103 identifies the devices 310B and 310D as an echo source, because each of the response delay times of the devices 310B and 310D is closer to each of the echo delay times 120 ms and 390 ms than that of the devices 310A and 310C. As shown above, each of the response delay times is obtained and stored with the response delay data acquiring unit 102 as illustrated in the table in FIG. 4B.

Consequently, even if an echo is generated at plural devices, the plural echo sources can be properly identified.

The following description is focused on various embodiments where the echo delay estimation algorithm is specified.

Figure 5:
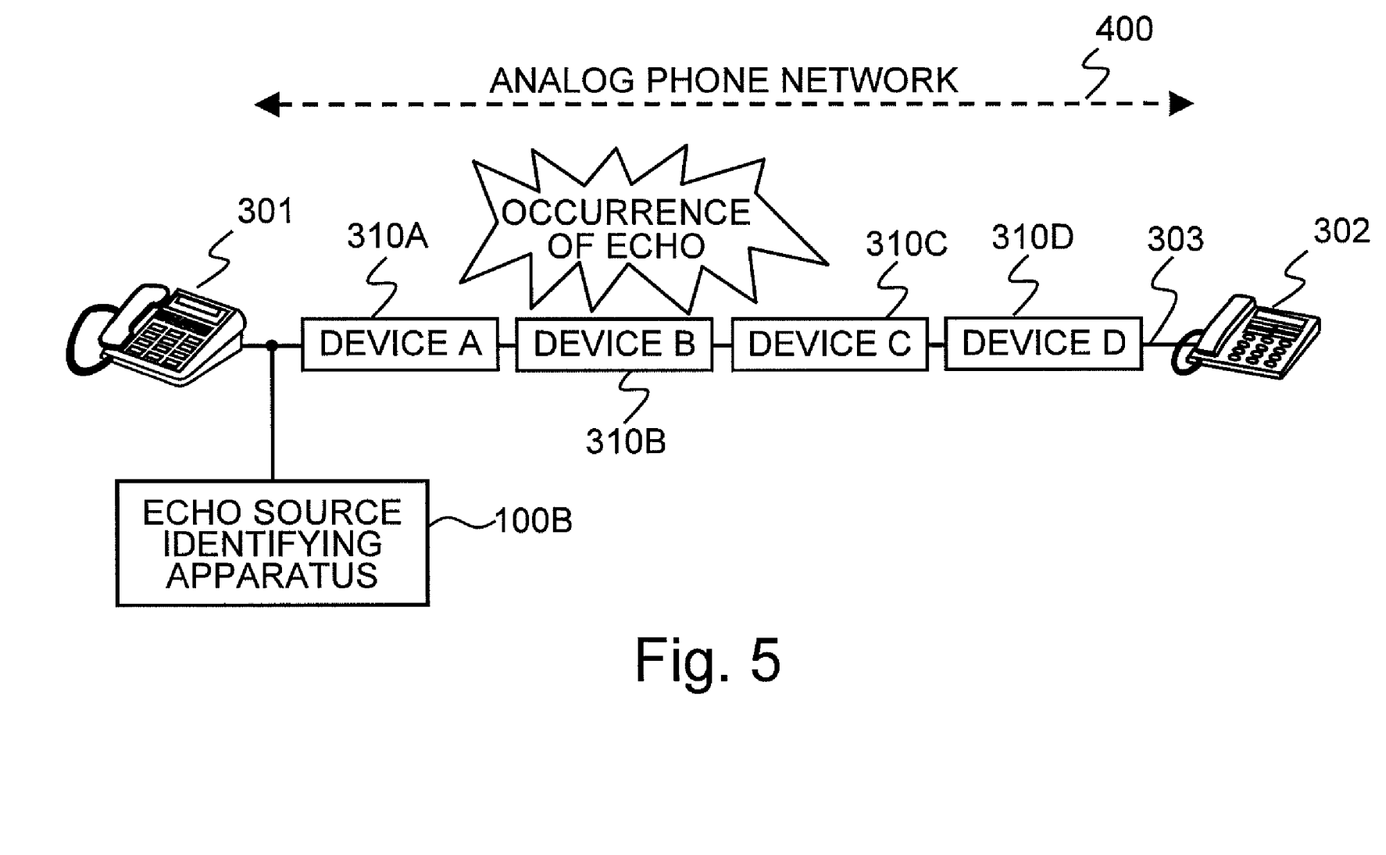
FIG. 5 is a diagram illustrating a communication path connected to an echo source identifying apparatus according to a second embodiment.

FIG. 5 illustrates a communication path connected to an echo source identifying apparatus according to a second embodiment.

The communication path 400 illustrated in FIG. 5 is assumed to be an analog phone network and is connected to an echo source identifying apparatus 100B.

Figure 6:
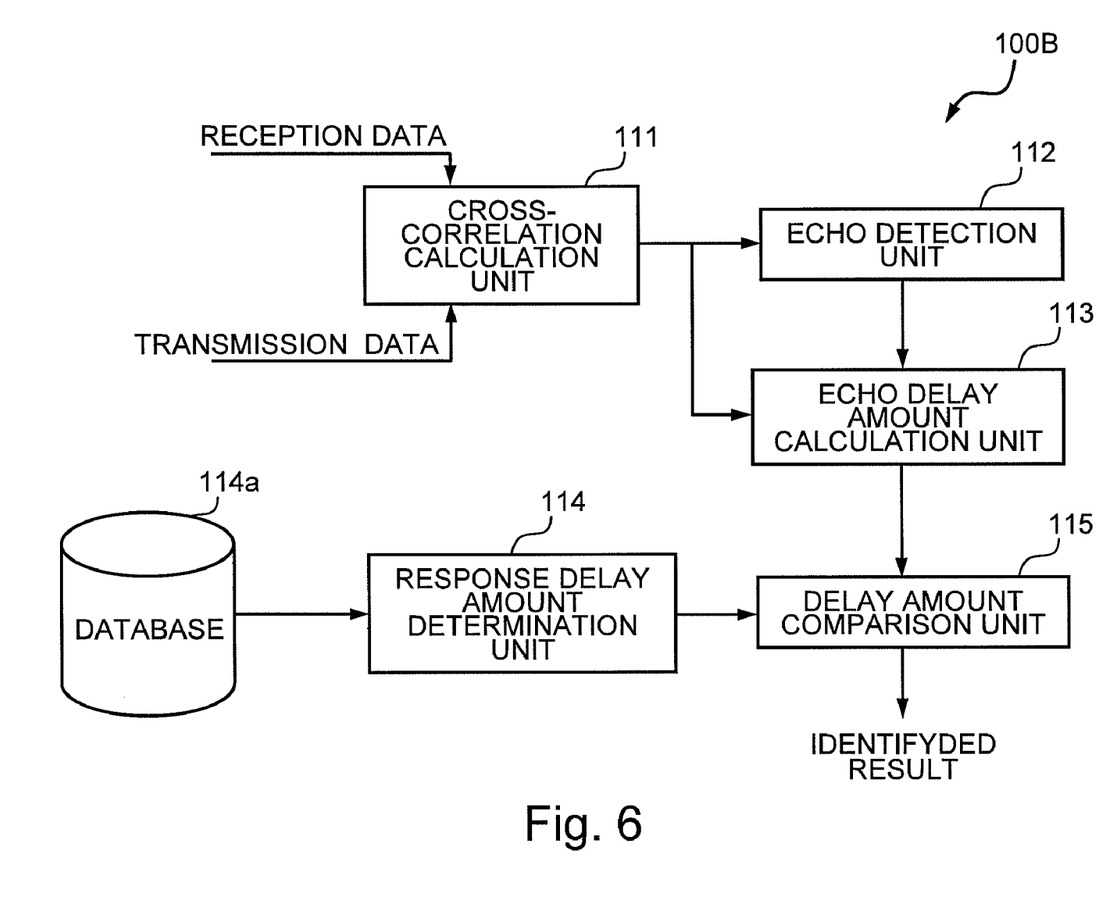
FIG. 6 is a block diagram of the configuration of the echo source identifying apparatus of the second embodiment illustrated in one block in FIG. 5.

FIG. 6 illustrates a block diagram of the configuration of the echo source identifying apparatus 100B illustrated in one block in FIG. 5.

The echo source identifying apparatus 100B includes a cross-correlation calculation unit 111, an echo detection unit 112, an echo delay amount calculation unit 113, a response delay amount determination unit 114, and a delay amount comparison unit 115. The response delay amount determination unit 114 includes a database (DB) 114a that stores the device-specific response delay time measured with the method (a), where the database unit 114a includes the table of data of the response delay time corresponding to the device such as ones illustrated in FIG. 4B. The response delay amount determination unit 114 functions to read the device-specific response delay time from the DB 114a to transfer the read data to the delay amount comparison unit 115.

The cross-correlation calculation unit 111 receives transmission data (upstream signal) and reception data (downstream signal), and calculates a cross-correlation value Rxy(m) between the transmission data and the reception data based on the following expression:

$$R_{xy}(m) = \sum_n x(n)y(m-n) \quad (1)$$

In Expression 1, x is reception data, y is transmission data, x(n) is n-th sampled value in the reception data, and y(n) is n-th sampled value in the transmission data.

The cross-correlation value Rxy(m) is input to the echo detection unit 112 and the echo delay amount calculation unit 113.

The echo detection unit 112 determines whether the cross-correlation value Rxy(m) received exceeds a threshold value.

If the cross-correlation value Rxy(m) exceeds a threshold value at any value of m and thus, then the echo detection unit 112 decides that an echo occurs. Information of the occurrence of echo and the value of m in the cross-correlation value Rxy(m) that exceeds a threshold value is sent to the echo delay amount calculation unit 113.

Upon receiving the information of the occurrence of echo, the echo delay amount calculation unit 113 derives an echo delay amount "delay" from the following expression (2) based on the cross-correlation value Rxy(m) and the value of m.

$$\text{delay} = \underset{m}{\text{argmax}}(R_{xy}(m)), \qquad (2)$$

where arg gives m which maximizes $R_{xy}(m)$.

In the case of calculating the echo delay amount "delay" based on the expression (2), a peak value around the value of m notified from the echo detection unit 112 is determined. Therefore, if the echo detection unit 112 detects that Rxy(m) exceeds a threshold value at plural separate values of m, the echo delay amount "delay" is calculated based on the expression (2) for each of the plural values. Here is assumed that the echo delay amount calculation unit 113 calculates 120 ms as an echo delay amount.

The echo delay amount calculated with the echo delay amount calculation unit 113 is input to the delay amount comparison unit 115, which compares the echo delay amount, such as 120 ms from the echo delay amount calculation unit 113 with the device-specific response delay time, such as ones in the table shown in FIG. 4B to identify an echo source. The echo delay amount calculated with the echo delay amount calculation unit 113 is, in this example, 120 ms, which is closest to the response delay time 110 ms of the device B in the table shown in FIG. 4B. Thus, in this case, the device 310B is identified as an echo source.

The analog phone network is described here by way of example, but the algorithm described with reference to FIG. 6 is applicable to an Internet protocol (IP) phone network for packet communications as well.

Figure 7:
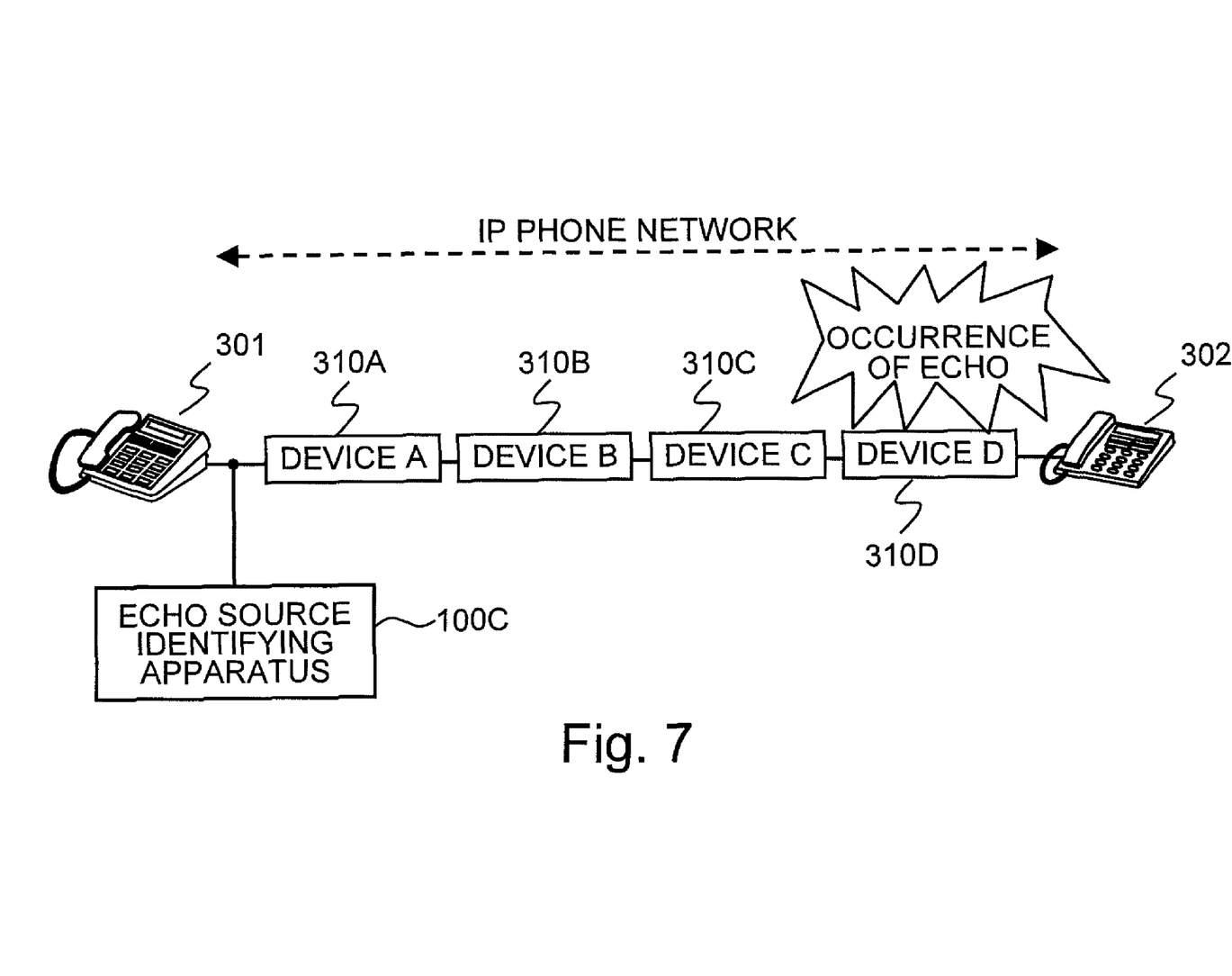
FIG. 7 is a diagram illustrating a communication path connected to an echo source identifying apparatus according to a third embodiment.

FIG. 7 illustrates a communication path such as IP telephone network connected to an echo source identifying apparatus according to a third embodiment of the present invention.

In the illustrated example, the communication path is assumed an IP phone network for transmitting/receiving packet data, where an echo source identifying apparatus 100C is connected to the IP phone network.

Figure 8:
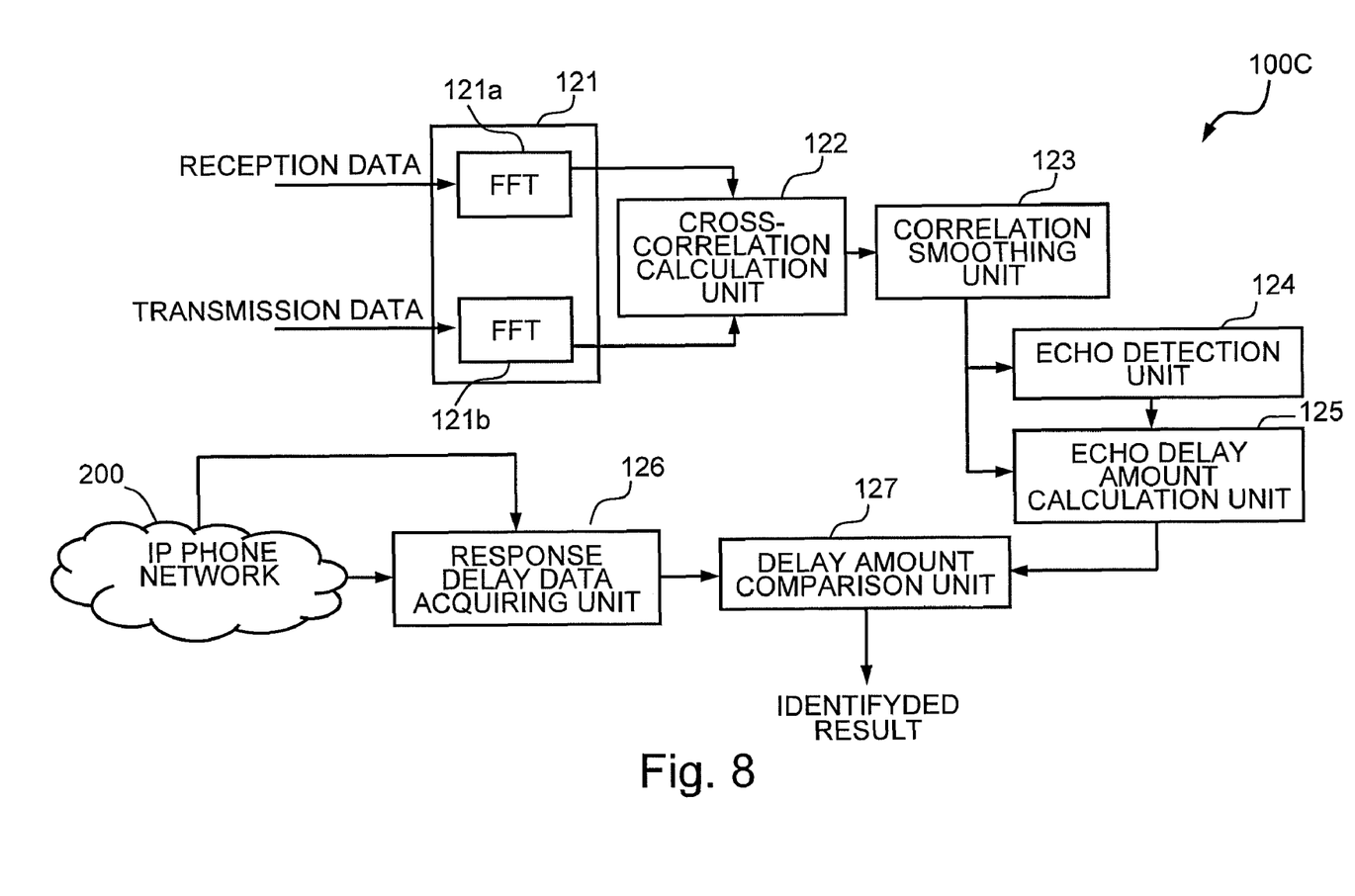
FIG. 8 is a block diagram illustrating the configuration of the echo source identifying apparatus of the third embodiment illustrated in one block in FIG. 7.

FIG. 8 illustrates a block diagram of the configuration of the echo source identifying apparatus 100C of the third embodiment illustrated in one block in FIG. 7.

The echo source identifying apparatus 100C in FIG. 8 includes a frequency analysis unit 121, a cross-correlation calculation unit 122, a correlation smoothing unit 123, an echo detection unit 124, an echo delay amount calculation unit 125, a response delay data acquiring unit 126, and a delay amount comparison unit 127.

The frequency analysis unit 121 includes an FFT calculation unit 121a for reception data and an FFT calculation unit 121b for transmission data. The frequency analysis unit 121 receives reception data and transmission data. The reception data and the transmission data are independently subjected to windowing processing and then Fast Fourier Transform (FFT) processing to thereby calculate a frequency spectrum for each of the reception data and the transmission data and for each of plural frames consecutive along a time axis direction.

A frequency spectrum X(m, f) of reception data and a frequency spectrum Y(m, f) of transmission data, which are calculated with the frequency analysis unit 121 by using the following expressions (3) to (6).

$$x'(n)=w(n)x(n) \qquad (3)$$

$$X(m,f) \Leftrightarrow x'(n) \qquad (4)$$

$$y'(n)=w(n)y(n) \qquad (5)$$

$$Y(m,f) \Leftrightarrow y'(n) \qquad (6)$$

In the expressions (3) to (6), x(n) is reception data, y(n) is transmission data, w(n) is window function (such as Hamming window), n is a sample number, m is a frame number, f is a frequency number, and ⇔ is Fourier transformation. The resultant frequency spectrum X(m,f) for the reception data and frequency spectrum Y(m, f) of transmission data are fed to the cross-correlation calculation unit 122 which calculates a cross-correlation value Rxy(m, i) with X(m, f) and Y(m, f) by using the following expression (7).

$$R_{xy}(m, i) = \sum_{f} X(m, f)Y(m-i, f) \qquad (7)$$

As apparent from the expression (7), Rxy(m, i) does not contain a variable "f" because the value is incremented in the direction of f, that is, the direction of frequency, while Rxy(m, i) contains variables "m" and "i" in the direction of frame (that is, the time axis direction). In other words, the expression (7) shows a frame-based cross-correlation value between reception data and transmission data.

After the cross-correlation calculation unit 122 calculates the cross-correlation value Rxy(m, i), the calculated cross-correlation value Rxy(m, i) is input to the correlation smoothing unit 123 and subjected to the smoothing processing based on the following expression (8).

$$\overline{R}_{xy}(m,i)=\overline{R}_{xy}(m-1,i)\times\alpha+R_{xy}(m,i)\times(1-\alpha) \qquad (8)$$

In the expression (8), α is a smoothing coefficient.

A cross-correlation value smoothed with the correlation smoothing unit 123 is input to the echo detection unit 124 and the echo delay amount calculation unit 125. The echo detection unit 124 detects the generation of an echo if the following the expression (9) is satisfied.

$$\underset{m}{\max}(\overline{R}_{xy}(m, i)) > THR \qquad (9)$$

In the expression 9, THR is a threshold value.

Then, the value "i" of the peak cross-correlation value which is larger than the threshold value THR, is fed to the echo delay amount calculation unit 125.

Similar to the second embodiment, the determination based on the expression (9) is to determine whether the peak local value i exceeds the threshold value THR. For example, if the value i varies, and plural peak local values larger than the threshold value THR are detected, the plural values of "i" are notified to the echo delay amount calculation unit 125.

The echo delay amount calculation unit 125 calculates the echo delay amount "delay" based on the following expression (10).

$$\text{If } \overline{R}_{xy}(m,i) > THR, \text{ then delay} = i \times N. \tag{10}$$

In the expression (10), "delay" is an echo delay (ms), and N is a frame length (ms). Then the calculated echo delay amount "delay" is sent to the delay amount comparison unit 127.

The response delay data acquiring unit 126 obtains the response delay time of each device based on the method (c) described above. More specifically, the response delay data acquiring unit 126 transmits IP packets to each device on the IP phone network 200, such as devices 310A, 310B, 310C, and 310D illustrated in FIG. 7, and measures each period (response delay time) until receiving each response for the individual IP packets.

The response delay time of each device thus obtained with the response delay data acquiring unit 126 is sent to the delay amount comparison unit 127.

The delay amount comparison unit 127 compares the echo delay amount "delay" with the response delay time of each device to identify a device as an echo source.

Figure 9:
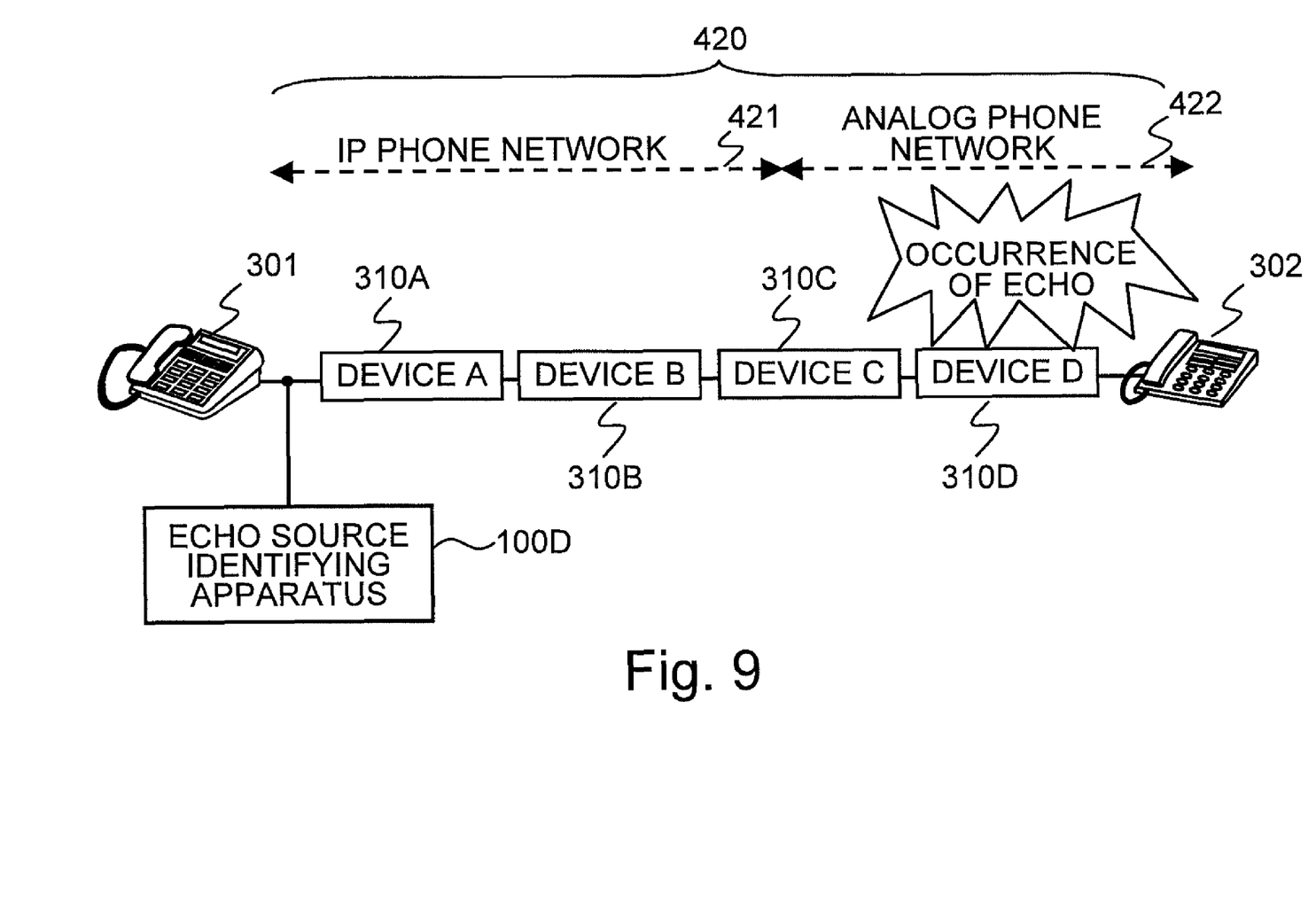
FIG. 9 is a diagram illustrating a communication path connected to an echo source identifying apparatus according to a fourth embodiment.

FIG. 9 illustrates a communication path connected to an echo source identifying apparatus according to a fourth embodiment.

The communication path 420 in FIG. 9 illustrates a network comprising several different kinds of networks such as an IP phone network 421 and an analog phone network 422. In the illustrated example, an echo source identifying apparatus 100D is connected to the communication path 420 for the mixed networks.

Figure 10:
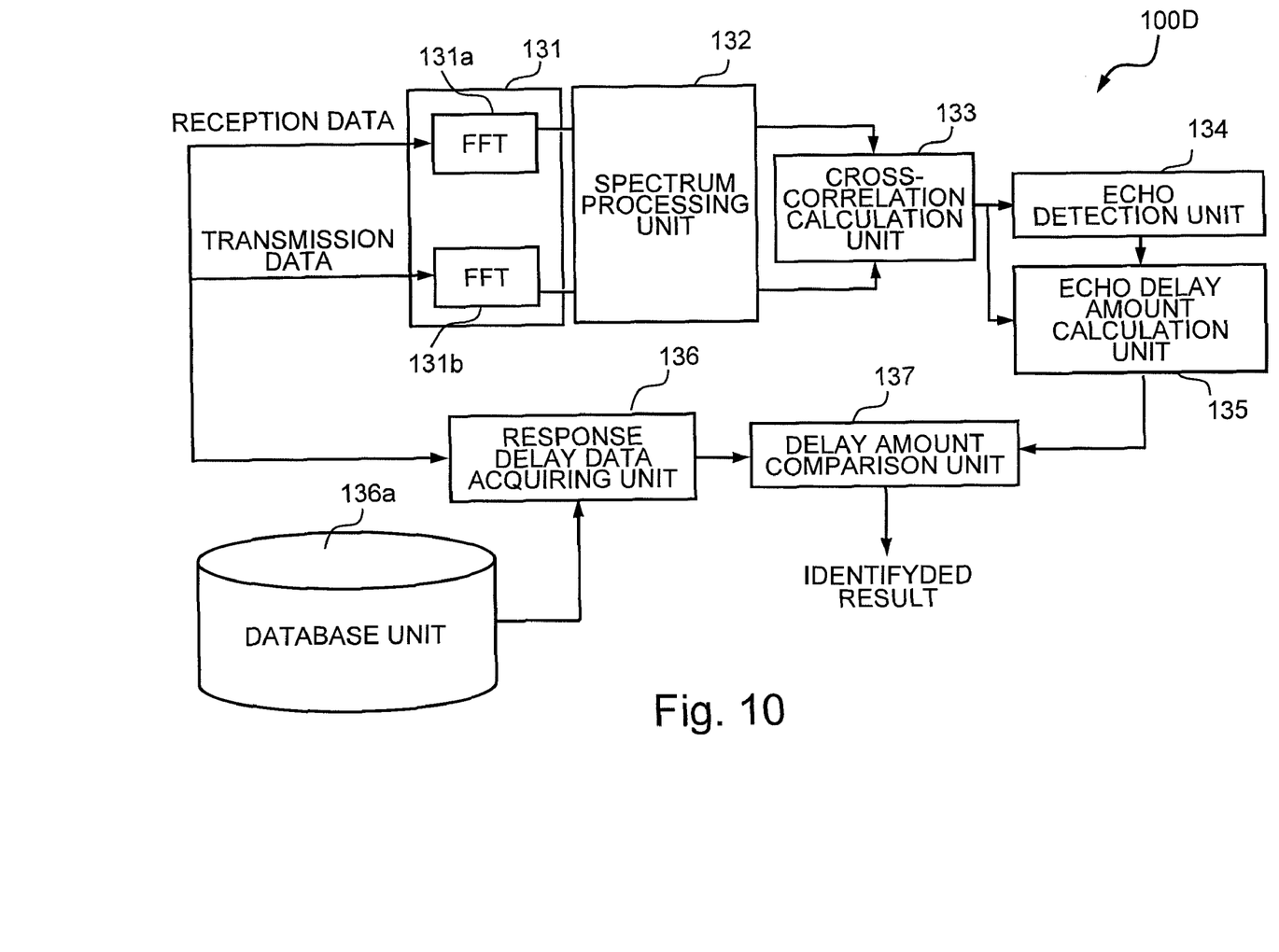
FIG. 10 is a block diagram illustrating the configuration of the echo source identifying apparatus illustrated in one block in FIG. 9.

FIG. 10 is a block diagram of the configuration of the echo source identifying apparatus 100D of the fourth embodiment illustrated in one block in FIG. 9.

The echo source identifying apparatus 100D includes a frequency analysis unit 131, a spectrum processing unit 132, a cross-correlation calculation unit 133, an echo detection unit 134, an echo delay amount calculation unit 135, a response delay data acquiring unit 136, and a delay amount comparison unit 137.

As for the devices such as the devices 310A, 310B, and 310C on the IP communication network 421 in FIG. 9, the response delay data acquiring unit 136 measures the response delay time based on the transmission time of a transmission packet and the reception time of a reception packet similar to the above embodiments (see FIG. 8). As for the device such as the device 310D on the analog communication network 422 in FIG. 9, a response delay time is separately measured with the method (a) and stored in a database (DB) 136a.

The response delay data acquiring unit 136 notifies the delay amount comparison unit 137 of the response delay time of each device on the IP phone network and on the analog phone network, while the response delay time of the device on the analog phone network is stored in the DB 136a.

Reception data and transmission data are input to the frequency analysis unit 131, in which the frequency analysis unit 131 and two FFT calculation units 131a and 131b are included. Since the frequency analysis unit 131 and the two FFT calculation units 131a and 131b are similar to the frequency analysis unit 121 and the two FFT calculation units 121a and 121b illustrated in FIG. 8 respectively, no explanation is described.

The spectrum processing unit 132 in FIG. 10 normalizes frequency spectra of reception data and transmission data to a numerical value range of −1 to 1 by using the following expressions (11) and (12).

$$X'(m, f) = 2 \times \frac{|X(m, f)|}{\max_{f}(|X(m, f)|)} - 1 \tag{11}$$

$$Y'(m, f) = 2 \times \frac{|Y(m, f)|}{\max_{f}(|Y(m, f)|)} - 1 \tag{12}$$

Using the frequency spectra normalized with the spectrum, the cross-correlation calculation unit 133 performs cross-correlation operation. The cross-correlation calculation unit 133 has the same function as that of the cross-correlation calculation unit 122 of the third embodiment illustrated in FIG. 8 except that the cross-correlation operation is performed using the frequency spectra normalized in the spectrum processing unit 132, and thus the description thereof is not repeated.

The cross-correlation value calculated with the cross-correlation calculation unit 133 is input to the echo detection unit 134 and the echo delay amount calculation unit 135.

The echo detection unit 134 and the echo delay amount calculation unit 135 of the fourth embodiment directly receive the cross-correlation value calculated with the cross-correlation calculation unit 133. These processes are different from the processes of the third embodiment in which the correlation smoothing unit 123 is provided to feed the smoothed cross-correlation value to the echo detection unit 124 and the echo delay amount calculation unit 125 (see FIG. 8). Since except these differences, the echo detection unit 134 and the echo delay amount calculation unit 135 have the same functions as those of the echo detection unit 124 and the echo delay amount calculation unit 125, the description thereof is not repeated.

Further, the delay amount comparison unit 137 is also similar to the delay amount comparison unit 127 in FIG. 8 and thus, repetitive description thereof is not given.

Next, an echo source identifying apparatus according to a fifth embodiment of the present invention is described.

The echo source identifying apparatus of the fifth embodiment is placed under the same environment as that of the echo source identifying apparatus 100D of the fourth embodiment, and its block configuration is similar to that of FIG. 10 and thus, the fifth embodiment is described with reference to FIGS. 9 and 10.

Figure 11:
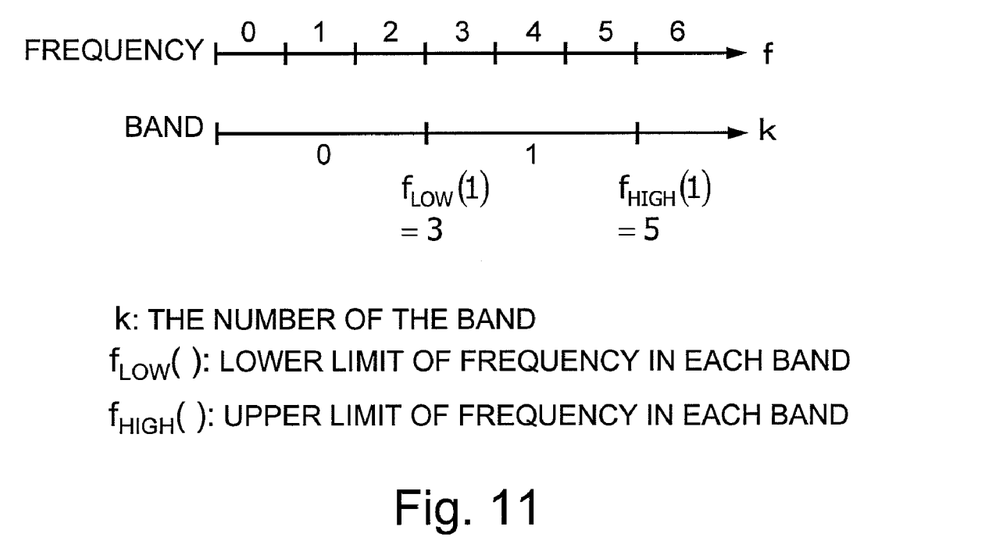
FIG. 11 is an explanatory view of cross-correlation operation according to a fifth embodiment.

FIG. 11 illustrates an explanatory view of cross-correlation operation of the fifth embodiment.

The cross-correlation calculation unit 133 of the fifth embodiment calculates a cross-correlation value for each of frequency bands obtained by dividing the entire frequency band of the frequency spectrum obtained with the frequency analysis unit 131 by using the following expression (13).

$$R_{xy}(m, i, k) = \sum_{f=f_{LOW}(k)}^{f_{HIGH}(k)} X'(m, f) Y'(m-i, f) \tag{13}$$

The echo detection unit 134 counts the number of frequency bands where the cross-correlation value of each of the frequency bands is larger than a threshold value among cross-correlation values of the frequency bands calculated with the cross-correlation calculation unit 133. When the number of frequency bands is larger than a threshold value, the expression (14) is satisfied, it is detected that the echo has been occurred.

$$num(m, i) = num_k(k \mid R_{xy}(m, i, k) > THR) \quad (14)$$

Further, the echo delay amount calculation unit 135 determines the thus-obtained delay amount as the echo delay time "delay" as shown in the expression (15).

If num(m,i)>THR2, then an echo is detected by the following expression (15).

$$delay = i \times N \quad (15)$$

In this example, the number of frequency bands of which the cross-correlation value in the echo detection unit 134 is larger than a threshold value, is counted. However, the number of frequency bands is counted locally in the time axis direction. Accordingly, if plural devices generate an echo, the generation of an echo is detected at each of the plural echo sources, and the echo delay amount calculation unit 135 also calculates the echo delay time at each of the echo sources to identify each of the echo sources.

In the fifth embodiment, a cross-correlation value is calculated in units of plural frequency bands. Thus, even if noise is mixed into any frequency band, the whole noise rarely influences the whole frequency band group, and the generation of an echo can be detected with higher accuracy.

Figure 12:
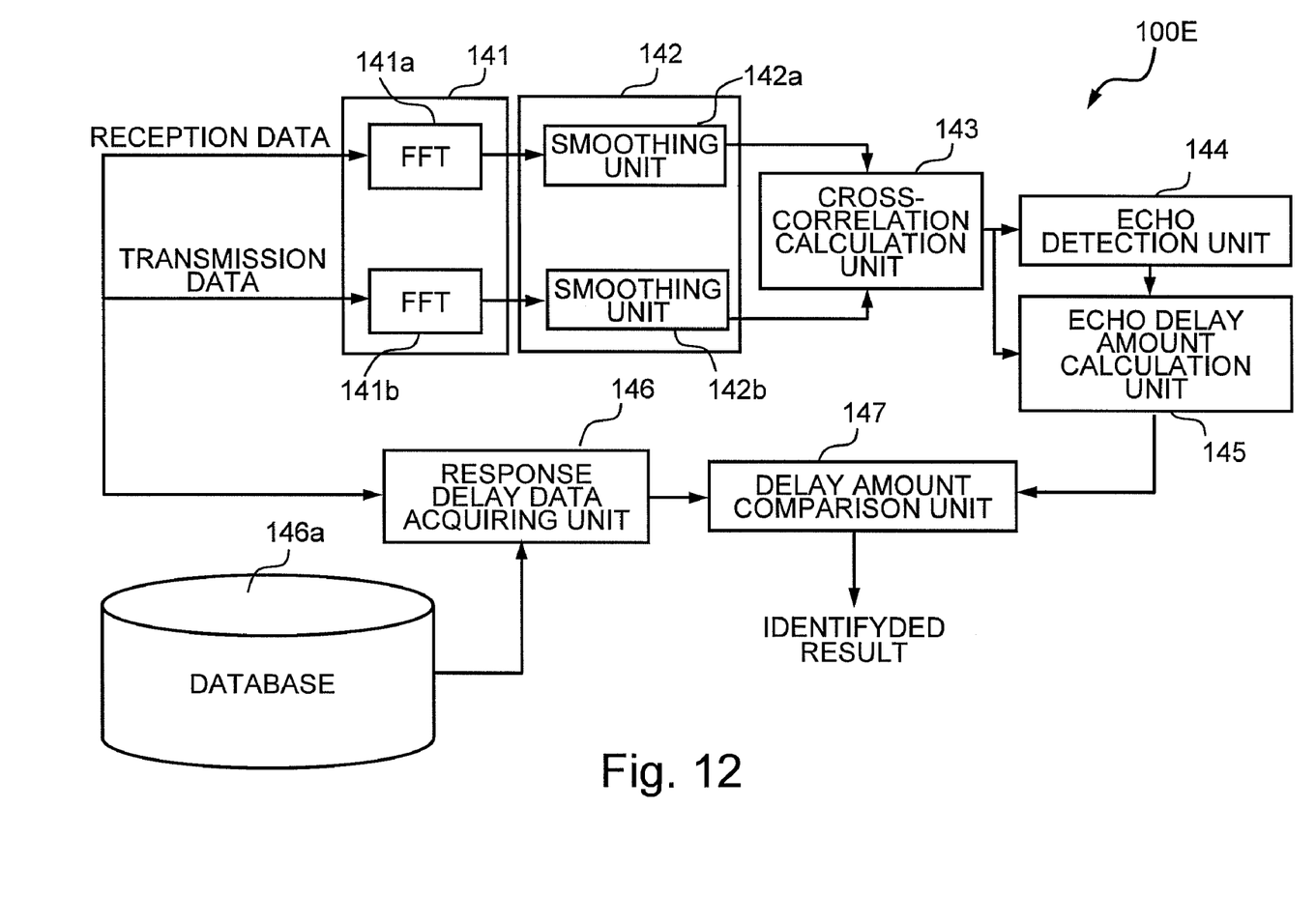
FIG. 12 is a block diagram illustrating the configuration of an echo source identifying apparatus according to a sixth embodiment.

FIG. 12 is a block diagram of the configuration of an echo source identifying apparatus according to a sixth embodiment.

The environment of a communication network connected with an echo source identifying apparatus 100E of the sixth embodiment is the same as those of the fourth and fifth embodiments (see FIG. 9).

The following description is made of a difference from the echo source identifying apparatus 100D of the fourth embodiment.

The echo source identifying apparatus 100E of the sixth embodiment shown in FIG. 12 is provided with a spectrum smoothing unit 142 in place of the spectrum processing unit 132 of the echo source identifying apparatus 100D of the fourth embodiment shown in FIG. 10.

The spectrum smoothing unit 142 is composed of a smoothing unit 142a for smoothing a frequency spectrum of reception data obtained with the FFT calculation unit 141a in the frequency analysis unit 141 and a smoothing unit 142b for smoothing a frequency spectrum of transmission data obtained with the other FFT calculation unit 141b. These smoothing processes are performed on the basis of following expressions (16) and (17) for the reception data and the transmission data respectively.

$$X'(m,f) = X(m-1,f) \times \alpha + X(m,f) \times (1-\alpha) \quad (16)$$

$$Y'(m,f) = Y(m-1,f) \times \alpha + Y(m,f) \times (1-\alpha) \quad (17)$$

In the expressions (16) and (17), α is a smoothing coefficient.

A cross-correlation calculation unit 143 calculates a cross-correlation value using the frequency spectra smoothing with the spectrum smoothing unit 142 as follows.

$$R_{xy}(m, i) = \sum_f X'(m, f) Y'(m - i, f) \quad (18)$$

The other components, such as the frequency analysis unit 141, the echo detection unit 144, the echo delay amount calculation unit 145, the response delay data acquiring unit 146, the DB 146a, and the delay amount comparison unit 147 correspond to the components of the echo source identifying apparatus 100D of the fourth embodiment illustrated in FIG. 10. That is, the frequency analysis unit 131, the echo detection unit 134, the echo delay amount calculation unit 135, the response delay data acquiring unit 136, the DB 136a, and the response delay data acquiring unit 136, and thus are not described again.

As described in the above embodiments, a wide variety of echo source identifying methods are applicable based on cross-correlation operations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method for identifying among a plurality of devices, through which a voice communication path is connected, a device transmitting an echo signal onto the voice communication path, comprising:

transmitting a predetermined signal to each of the devices from a predetermined portion on the voice communication path;

receiving a response signal for the predetermined signal from each of the devices;

measuring a period of time for the predetermined signal to travel from the predetermined portion to each of the devices and for the response signal to travel back to the predetermined portion;

monitoring an upstream signal and a downstream signal traveling on the voice communication path;

extracting an eco component from the downstream signal to determine an echo delay time; and comparing the period of time and the echo delay time to determine a device which causes the echo signal.

2. The method according claim 1, further comprising:

detecting a presence of an echo signal on the voice communication path, wherein the echo delay time is determined on the basis of the data in the step of extracting.

3. An echo source identifying method for identifying an echo source on a voice transmission path on which voice communication data is transmitted, comprising:

measuring a transmission delay amount required to come back from each of a plurality of portions on the voice transmission path;

estimating a delay amount of the echo based on transmission data transmitted to the voice transmission path and reception data received from the voice transmission path; and comparing the transmission delay amount of each of the plurality of portions with the delay amount of the echo to identify a portion in which an echo occurs.

4. The echo source identifying method according to claim 3, further comprising detecting an occurrence of an echo on the basis of data transmitted and received between two device connected to the voice transmission path; and the step of estimating begins to estimate the delay amount of the echo after a detection of the occurrence of the echo by the step of the detecting.

5. The echo source identifying method according to claim 4, further comprising:
   determining a cross-correlation between the transmission data and the reception data,
   wherein the step of detecting and the step of estimating are a step of detecting occurrence of an echo and a step of estimating an echo delay amount, respectively based on the cross-correlation determined by the step of determining.

6. The echo source identifying method according to according to claim 4, further comprising:
   calculating frequency spectra on a unit time basis of the transmission data and the reception data divided by unit time; and
   obtaining a cross correlation in a time axis direction between the frequency spectra of the transmission data and the reception data calculated in the step of calculating,
   wherein the step of the detecting the occurrence of the echo and the step of estimating a delay amount of the echo are a step of detecting occurrence of an echo and a step of estimating an echo delay amount respectively based on the cross correlation obtained in the step of obtaining the cross correlation.

7. The echo source identifying method according to claim 6, further comprising:
   smoothing the cross correlation obtained in the step of obtaining the cross correlation in a time axis direction,
   wherein the step of the detecting and the step of estimating the echo delay amount are a step of detecting occurrence of an echo and a step of estimating an echo delay amount respectively based on the cross correlation smoothed in the step of smoothing.

8. The echo source identifying method according to claim 6, further comprising:
   processing normalization the frequency spectra calculated in the step of calculating the frequency spectra within a predetermined numerical range,
   wherein the step of the calculating the cross correlation calculation is a step of calculating a cross correlation using the frequency spectra normalized in the step of processing the normalization.

9. The echo source identifying method according to claim 6, further comprising:
   smoothing the frequency spectra of the transmission data and the reception data calculated in the step of calculating in a time axis direction,
   wherein the step of the calculating the cross correlation is a step of calculating a cross correlation using the frequency spectra smoothed in the step of smoothing the frequency spectra.

10. The echo source identifying method according to claim 6, wherein the step of calculating the cross correlation is a step of calculating a cross correlation in units of a plurality of frequency bands between the frequency spectra of the transmission data and the reception data, the frequency spectra being calculated in the step of calculating the frequency spectra.

11. A measuring apparatus for identifying a source of an echo of a voice transmitted from a transmission device connected with a voice transmission path, comprising:
   a transmission delay measuring section for transmitting a predetermined signal to the voice transmission path and receiving the predetermined signal sent back from the transmission device to measure a transmission delay at the transmission device;
   an echo delay measuring section for measuring a delay time of the echo based on data transmitted in one direction on the voice transmission path and data transmitted in the other direction; and
   an identifying section for identifying the transmission device which generates the echo based on the transmission delay and the delay time of the echo.

12. The measuring apparatus according to claim 11, wherein the echo delay measuring section includes a detector for detecting whether an echo occurs and begins to measure an echo delay time when the detector detects an echo.

13. An echo source identifying apparatus for identifying an echo source on a voice transmission path for transmitting voice communication data comprising:
   a transmission delay amount measuring section for measuring a transmission delay amount corresponding to a time required for the data to come back from each of a plurality of portions at which an echo potentially occurs an echo, the plurality of portions being on the voice transmission path;
   an echo delay amount estimating section for estimating a delay amount of the echo based on transmission data transmitted to the voice transmission path and reception data received from the voice transmission path; and
   a delay amount comparison section for comparing the transmission delay amount of each of the plurality of portions with a delay amount of the echo estimated by the echo delay amount estimating section to identify an echo source among the plurality of portions.

14. The echo source identifying apparatus according to claim 13, further comprising:
   an echo detector for detecting an occurrence of an echo based on the transmission data and the reception data, which are transmitted and received between terminals on the voice transmission path,
   wherein the echo delay amount estimating section estimates the echo delay amount in response to detection of the occurrence of the echo in the echo detector.

15. The echo source identifying apparatus according to claim 14, further comprising:
   a cross correlation operation section for determining a cross correlation between the transmission data and the reception data,
   wherein the echo detector detects the occurrence of the echo and the echo delay amount estimating section estimates the echo delay amount based on the cross correlation.

16. The echo source identifying apparatus according to claim 14, further comprising:
   a spectrum calculator for calculating on a unit time basis frequency spectra of the transmission data and the reception data which are divided by unit time; and
   a cross correlation operation section for determining a cross correlation in a time axis direction between the frequency spectra of the transmission data and the reception data,
   wherein the echo detector detects the occurrence of the echo and the echo delay amount estimating section estimates the echo delay amount based on the cross correlation.

17. The echo source identifying apparatus according to claim 16, further comprising:
   a correlation smoothing section for smoothing the cross correlation obtained with the cross correlation operation section in a time axis direction, wherein the echo detector and the echo delay amount estimating section detects the occurrence of the echo and estimates the echo delay amount based on the cross correlation smoothed respectively.

18. The echo source identifying apparatus according to claim 16, further comprising:

a spectrum processing section for normalizing the frequency spectra calculated with the spectrum calculator to frequency spectra within a predetermined numerical range, wherein the cross correlation operation section calculates a cross correlation using the frequency spectra normalized.

19. The echo source identifying apparatus according to claim 16, further comprising:

a spectrum smoothing section for smoothing the frequency spectra of transmission data and the reception data calculated with the spectrum calculation unit in a time axis direction, wherein the cross correlation calculator unit calculates a cross correlation using the frequency spectra smoothed.

20. The echo source identifying apparatus according to claim 16, wherein the cross correlation operation unit calculates a cross correlation in units of a plurality of frequency bands between the frequency spectra of the transmission data and the reception data.

* * * * *